US 9,312,600 B2

(12) United States Patent
Wang et al.

(10) Patent No.: US 9,312,600 B2
(45) Date of Patent: Apr. 12, 2016

(54) STYLUS AND ANTENNA THEREOF

(71) Applicants: Jen-Yu Wang, Taipei (TW); Wei-Cheng Lo, Taipei (TW); Yu-Chia Chang, Taipei (TW); Meng-Huan Wu, Taipei (TW); Chia-Hao Chang, Taipei (TW)

(72) Inventors: Jen-Yu Wang, Taipei (TW); Wei-Cheng Lo, Taipei (TW); Yu-Chia Chang, Taipei (TW); Meng-Huan Wu, Taipei (TW); Chia-Hao Chang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 96 days.

(21) Appl. No.: 13/775,262

(22) Filed: Feb. 25, 2013

(65) Prior Publication Data
US 2013/0234998 A1    Sep. 12, 2013

Related U.S. Application Data

(60) Provisional application No. 61/606,996, filed on Mar. 6, 2012.

(30) Foreign Application Priority Data

Jan. 10, 2013   (TW) .............................. 102100940 A

(51) Int. Cl.
G06F 3/033    (2013.01)
H01Q 1/52    (2006.01)
G06F 3/0354    (2013.01)
H01Q 1/44    (2006.01)
H01Q 9/04    (2006.01)

(52) U.S. Cl.
CPC .............. *H01Q 1/52* (2013.01); *G06F 3/03545* (2013.01); *H01Q 1/44* (2013.01); *H01Q 9/0421* (2013.01)

(58) Field of Classification Search
CPC .................................................... G06F 3/03545
USPC ........................................................... 345/179
See application file for complete search history.

(56) References Cited

U.S. PATENT DOCUMENTS

| | | | |
|---|---|---|---|
| 6,429,827 B1 | 8/2002 | Hsueh et al. | |
| 6,659,673 B1 * | 12/2003 | Haffner et al. | ................. 401/258 |
| 6,876,333 B2 | 4/2005 | Tasi | |
| 2001/0025289 A1 * | 9/2001 | Jenkins | ................. G06F 1/3203 708/141 |

(Continued)

FOREIGN PATENT DOCUMENTS

| | | | | |
|---|---|---|---|---|
| CN | 201194246 | | 2/2009 | |
| CN | 101853979 | | 10/2010 | |
| CN | 102215652 A | * | 10/2011 | ............. H05K 5/02 |
| JP | 08242273 A | * | 9/1996 | ............. H04M 1/00 |
| JP | 2001063283 A | * | 3/2001 | ............. B43K 24/10 |
| TW | M370129 | | 12/2009 | |

OTHER PUBLICATIONS

Machine based English translation of Japanese Publication JP 08242273.*

(Continued)

*Primary Examiner* — Long D Pham
(74) *Attorney, Agent, or Firm* — Jianq Chyun IP Office

(57) ABSTRACT

A stylus includes a conductive rod, a circuit board, and an antenna. The conductive rod has a first opening. The circuit board is disposed in the conductive rod and includes a ground portion, wherein the conductive rod is electrically connected to the ground portion. The antenna includes a radiating portion and a feeding portion. The feeding portion is electrically connected to the circuit board and extends to the outside of the conductive rod via the first opening. The radiating portion is disposed at the outside of the conductive rod and is electrically connected to the feeding portion.

14 Claims, 13 Drawing Sheets

(56) References Cited

U.S. PATENT DOCUMENTS

2010/0214252 A1* 8/2010 Wu .............................. 345/174
2011/0304577 A1* 12/2011 Brown ................ G06F 3/03545
                                                                                                               345/174

OTHER PUBLICATIONS

Machine based English translation of Japanese Publication 2001-63283 A.*

* cited by examiner

US 9,312,600 B2

STYLUS AND ANTENNA THEREOF

CROSS-REFERENCE TO RELATED APPLICATION

This application claims the priority benefits of U.S. provisional application Ser. No. 61/606,996, filed on Mar. 6, 2012 and Taiwan application serial no. 102100940, filed on Jan. 10, 2013. The entirety of each of the above-mentioned patent applications is hereby incorporated by reference herein and made a part of this specification.

BACKGROUND OF THE INVENTION

1. Field of the Invention

The invention relates to a stylus and, more particularly, to a stylus including an antenna.

2. Description of the Related Art

As science technology develops, wireless communication technology is widely used nowadays, such as a smart phone, a tablet personal computer (PC) and a notebook computer with a wireless fidelity (WIFI) function. The wireless communication usually uses an antenna to transmit signals.

Taking a stylus as an example, the stylus usually uses metal or conductive material as housing material according to requirements of appearance or design. However, if the stylus includes a conductive housing, the signal transmitting of the antenna may be affected by the conductive housing. Thus, the signal transmitting efficiency of the antenna disposed in the conductive housing needs to be improved.

BRIEF SUMMARY OF THE INVENTION

A stylus and an antenna of the stylus has good signal transmitting efficiency are provided.

A stylus includes a conductive rod, a circuit board and an antenna. The conductive rod has a first opening. The circuit board is disposed in the conductive rod and includes a ground portion, and the conductive rod is electrically connected to the ground portion. The antenna includes a radiating portion and a feeding portion. The feeding portion is electrically connected to the circuit board and extends from inside of the conductive rod to outside via the first opening. The radiating portion is disposed at outside of the conductive rod and is electrically connected to the feeding portion.

In sum, the conductive rod of the stylus is connected to the ground portion of the circuit board, so as to reduce the interference on the antenna of the stylus from the conductive rod. Consequently, even though the rod of the stylus is made of metal or other conductive materials according to requirements of appearance or design, the antenna of the stylus still has good signal transmitting efficiency.

These and other features, aspects and advantages of the present invention will become better understood with regard to the following description, appended claims, and accompanying drawings.

BRIEF DESCRIPTION OF THE DRAWINGS

FIG. 9 is a schematic diagram showing that the radiating portion in FIG. 8A slides to another position;

DETAILED DESCRIPTION OF THE EMBODIMENTS

Figure 1A:
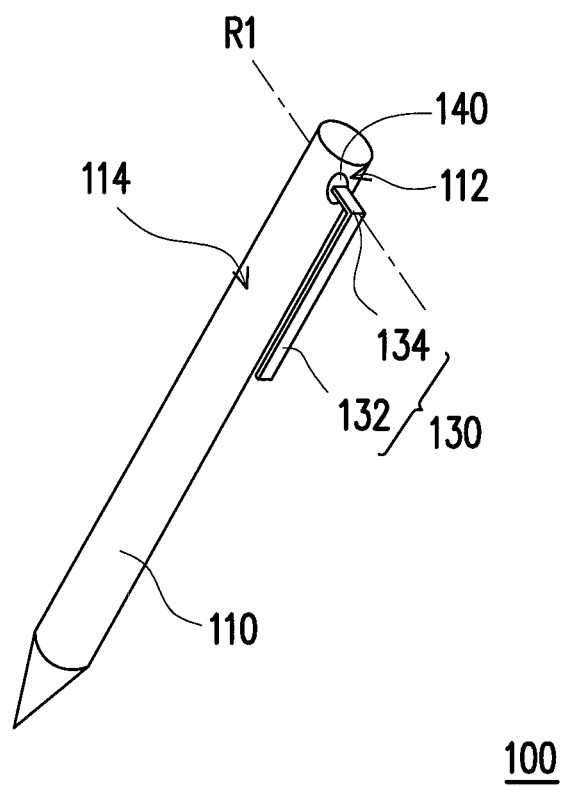
FIG. 1A is a schematic diagram showing a stylus in a first embodiment.
Figure 1B:
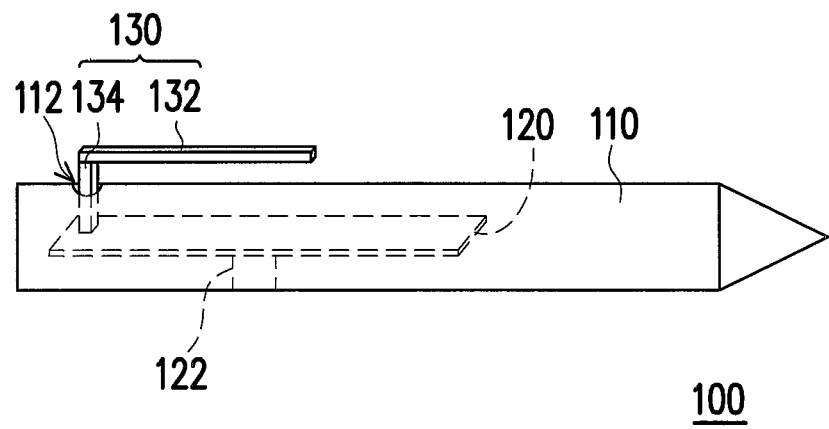
FIG. 1B is a sectional diagram showing the stylus in FIG. 1A.
Figure 1C:
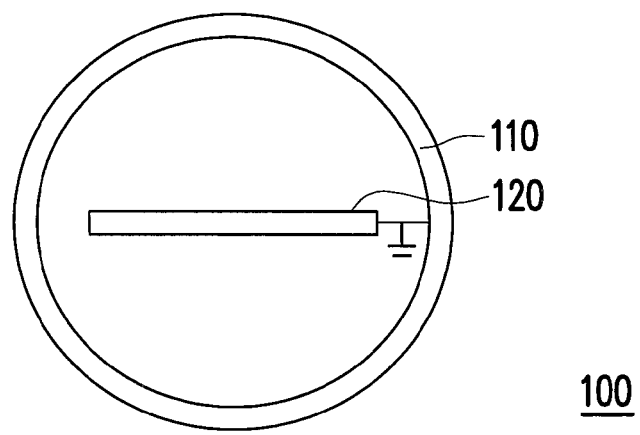
FIG. 1C is a sectional diagram showing the stylus in FIG. 1A from another angle of view.

FIG. 1A is a schematic diagram showing a stylus in a first embodiment. FIG. 1B is a sectional diagram showing the stylus in FIG. 1A. FIG. 1C is a sectional diagram showing the stylus in FIG. 1A from another angle of view. Please refer to FIG. 1A to FIG. 1C, a stylus 100 includes a conductive rod 110, a circuit board 120 and an antenna 130. The conductive rod 110 may be made of metal, and it has a first opening 112. The circuit board 120 is disposed in the conductive rod 110 and includes a ground portion 122. The conductive rod 110 is electrically connected to the ground portion 122. The antenna 130 may be a monopole antenna, and it includes ground portion 122. The antenna 130, for example, is a monopole antenna, which includes a radiating portion 132 and a feeding portion. The feeding portion 134 is electrically connected to the circuit board 120 and extends from inside of the conductive rod 110 to outside via the first opening 112. The radiating portion 132 is disposed at the outside of the conductive rod 110 and is electrically connected to the feeding portion 134.

The stylus 100 may be used to operate a touch control electronic device (not shown), such as a tablet computer. As shown in FIG. 1A, in the embodiment, the antenna 130 may be used as a clamp of the stylus 100, and the user can fix the stylus 100 to a user's pocket or other positions via the antenna 130. Moreover, the antenna 130 can receive and transmit signals, and thus the stylus 100 can receive a wireless signal, such as a Bluetooth signal, of the touch control electronic device. The conductive rod 110 is electrically connected to the ground portion 122 of the circuit board 120, and thus the interference on the antenna 130 from the conductive rod 110 is reduced. Consequently, even though the rod of the stylus 100 is made of metal or other conductive materials according to requirements of appearance or design, the antenna 130 of the stylus 100 still has good signal transmitting efficiency.

Please refer to FIG. 1A, the radiating portion 132 of the antenna 130 is pivotally connected to the feeding portion 134 around a rotating axis R1, and thus the radiating portion 132 can rotate relative to the feeding portion 134. In the embodiment, the rotating axis R1 is a central axis of the first opening 112, and the first opening 112 is formed at one side 114 of the conductive rod 110.

Figure 2:
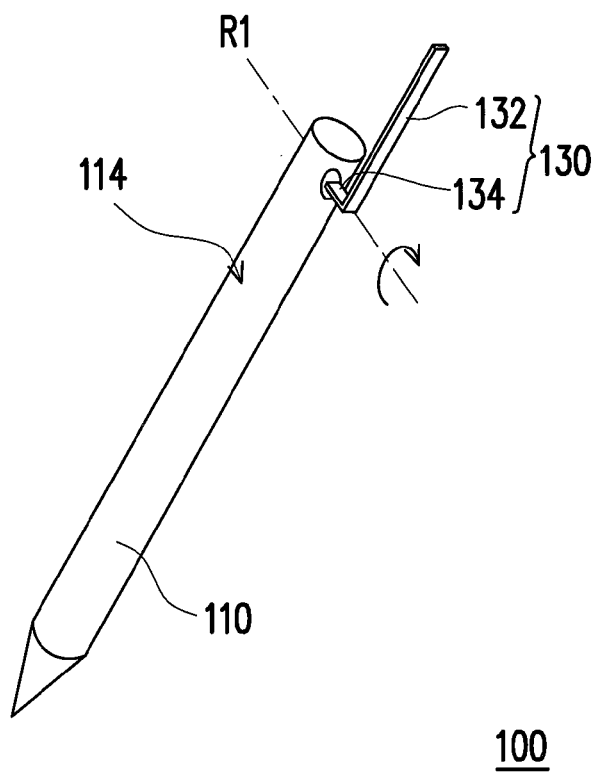
FIG. 2 is schematic diagram showing that the radiating portion in FIG. 1A rotates to another position.

FIG. 2 is schematic diagram showing that the radiating portion in FIG. 1A rotates to another position. As shown in FIG. 2, the user can rotate the radiating portion 132 is rotated around the rotating axis R1 so as to make part of the radiating portion 132 around the rotating axis R1 which makes the radiating portion 132 away from the conductive rod 110. Thus, when the user uses the antenna 130 of the stylus 100 to receive and transmit signals, the interference on the antenna 130 from the conductive rod 110 is further reduced.

As shown in FIG. 1A, the stylus 100 further includes an insulator 140 disposed in the first opening 112 to electrically insulate the feeding portion 134 and the conductive rod 110, which avoids the interference on signal transmitting of the antenna 130 from the conductive rod 110.

Figure 3A:
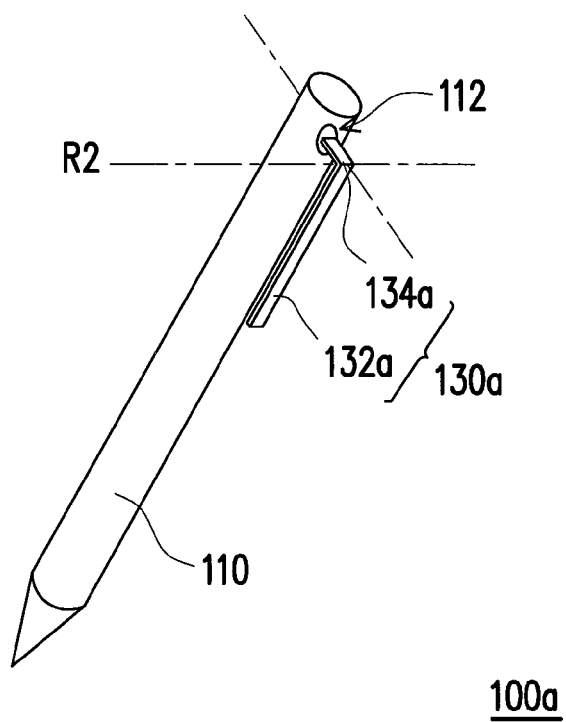
FIG. 3A is a schematic diagram showing a stylus in a second embodiment.
Figure 3B:
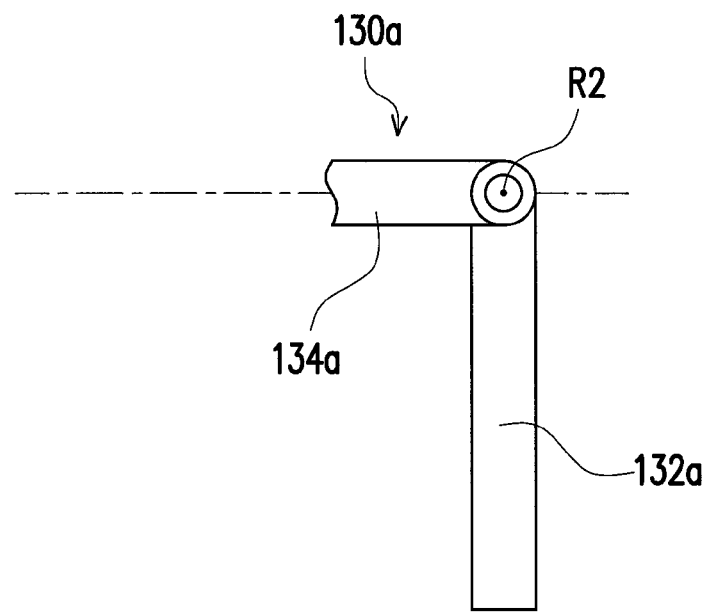
FIG. 3B is a partial top view showing the stylus in FIG. 3A.

FIG. 3A is a schematic diagram showing a stylus in a second embodiment, and FIG. 3B is a partial top view showing the stylus in FIG. 3A. Symbols for elements and a part of comments in FIG. 3A are similar to those in FIG. 1A, the same symbols denote the same or similar components, and the same descriptions for technology are omitted.

Figure 4A:
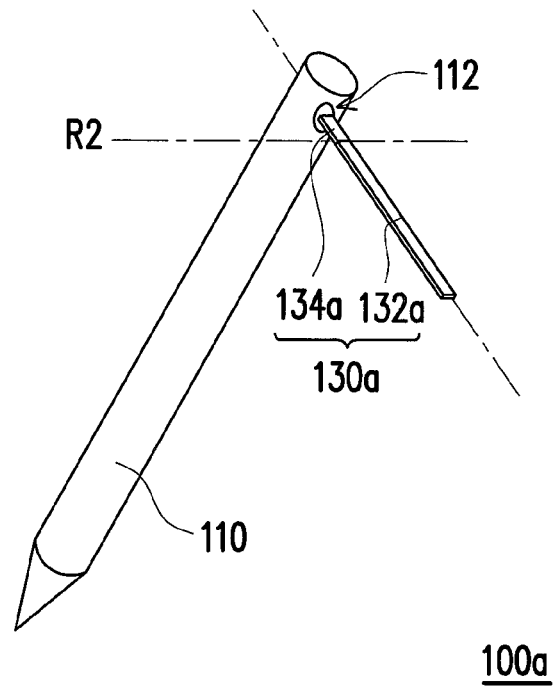
FIG. 4A is schematic diagram showing that the radiating portion in FIG. 3A rotates to another position.
Figure 4B:
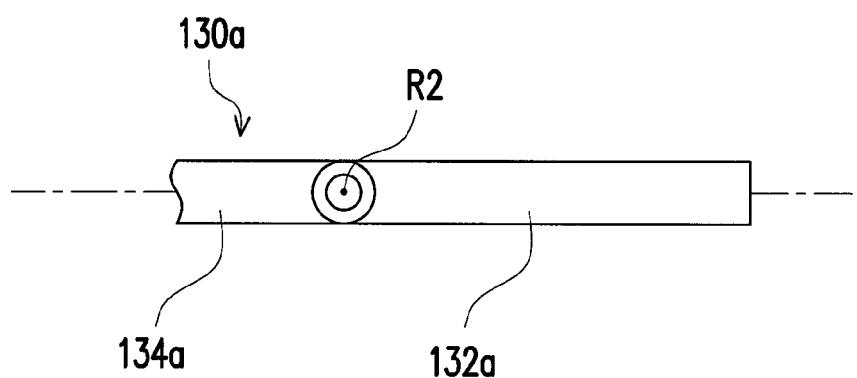
FIG. 4B is a partial side view showing the stylus in FIG. 4A.

Please refer to FIG. 3A and FIG. 3B, in the embodiment, the antenna 130a includes a radiating portion 132a and a feeding portion 134a, and the radiating portion 132a is pivotally connected to the feeding portion 134a via a rotating axis R2 to rotate relative to the feeding portion 134a. Moreover, in the embodiment, the rotating axis R2 is vertical to the central axis of the first opening 112. The direction of the rotating axis in FIG. 3A is different from that in FIG. 1A. FIG. 4A is schematic diagram showing that the radiating portion in FIG. 3A rotates to another position, and FIG. 4B is a partial side view showing the stylus in FIG. 4A. Please refer to FIG. 4A and FIG. 4B, the user rotates the radiating part 132a around the rotating axis R2 to make part of the radiating portion 132a away from the conductive rod 110. Thus, when the user uses the antenna 130a of the stylus 100a to receive and transmit signals, the interference on the antenna 130a from the conductive rod 110 is further reduced.

Figure 5A:
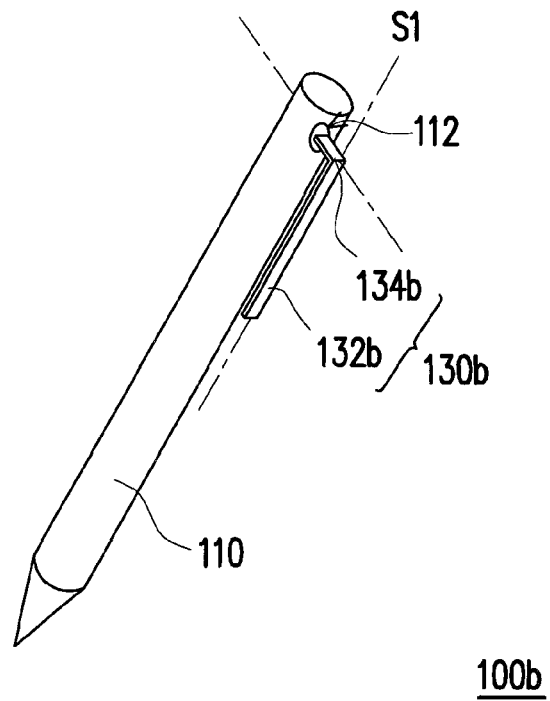
FIG. 5A is a schematic diagram showing a stylus in a third embodiment.
Figure 5B:
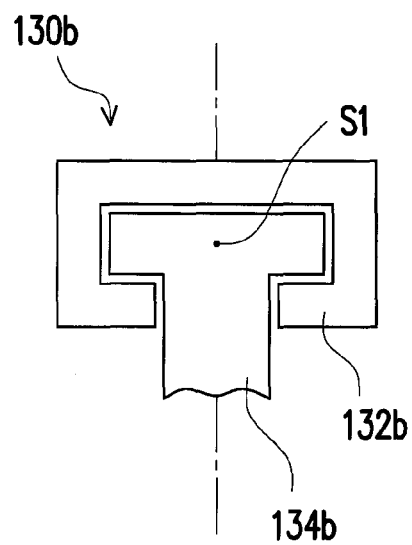
FIG. 5B is a sectional diagram showing the antenna in FIG. 5A.

FIG. 5A is a schematic diagram showing a stylus in a third embodiment, and FIG. 5B is a sectional diagram showing the antenna in FIG. 5A. Symbols for elements and a part of comments in FIG. 5A are similar to those in FIG. 1A, the same symbols denote the same or similar components, and the same descriptions for technology are omitted.

Figure 6:
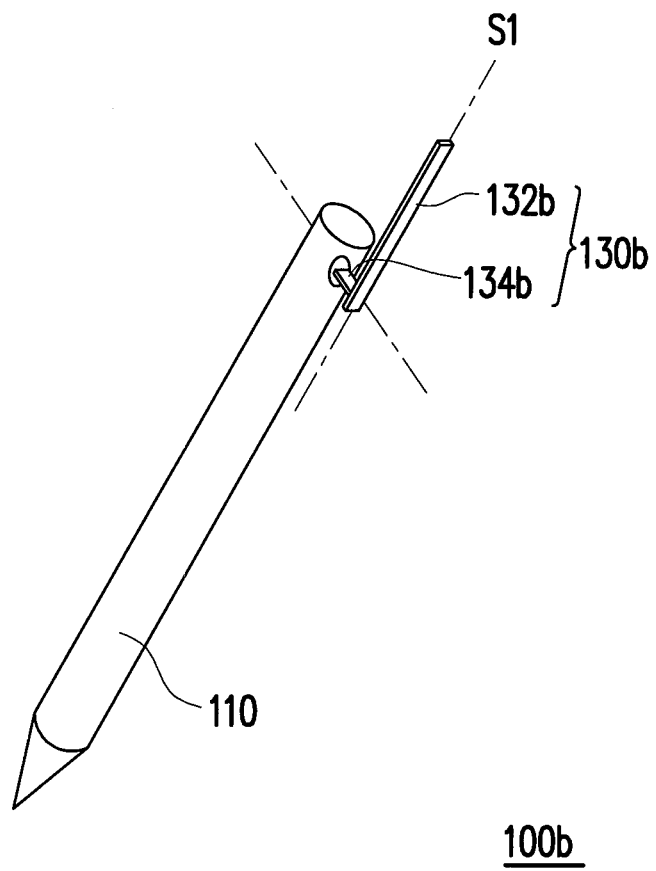
FIG. 6 is a schematic diagram showing that the radiating portion in FIG. 5A slides to another position.

Please refer to FIG. 5A and FIG. 5B, in the embodiment, the antenna 130b includes a radiating portion 132b and a feeding portion 134b, the radiating portion 132b is slidably disposed at the feeding portion 134b around a sliding axis S1, and the sliding axis S1 is vertical to the central axis of the first opening 112. In the embodiment, the radiating portion 132b is a sliding groove and the feeding portion 134b is a bar to make the radiating portion 132b slide stably. FIG. 6 is a schematic diagram showing that the radiating portion in FIG. 5A slides to another position. The radiating portion 132b slides around the sliding axis S1 to make part of the radiating portion 132b away from the conductive rod 110. Thus, when the user uses the antenna 130b of the stylus 100b to receive and transmit signals, the interference on the antenna 130b from the conductive rod 110 is further reduced. Moreover, in the embodiment, when the radiating portion 132b is at the position shown in FIG. 5A or FIG. 6, the radiating portion 132b may be fixed via a fixing structure (such as a fixing bump formed at the radiating portion 132b) to avoid unexpected sliding.

Figure 7A:
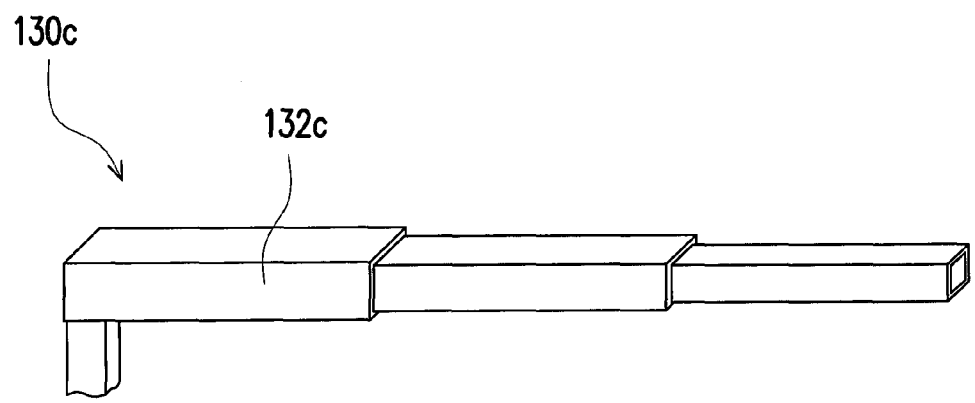
FIG. 7A is a schematic diagram showing the antenna in another embodiment in FIG. 1A.
Figure 7B:
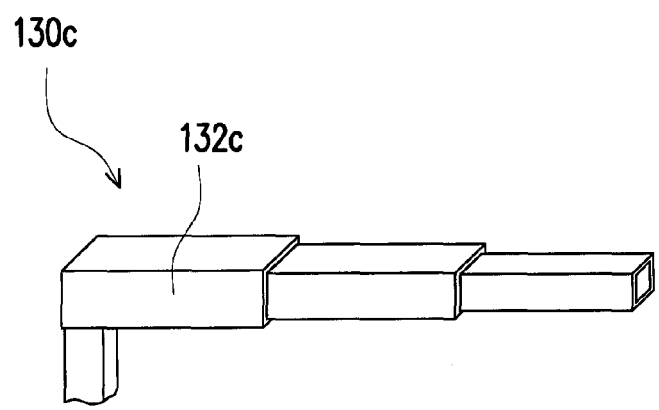
FIG. 7B is a schematic diagram showing that length of the radiating portion in FIG. 7A is reduced.

FIG. 7A is a schematic diagram showing the antenna in FIG. 1A in another embodiment, and FIG. 7B is a schematic diagram showing that length of the radiating portion in FIG. 7A is reduced. Please refer to FIG. 7A and FIG. 7B, in the embodiment, the radiating portion 132c is a stretchable structure which can change the length. For example, the radiating portion 132c can shorten from a state in FIG. 7A to another state in FIG. 7B. Thus, the length of the radiating portion 132c of the antenna 130c can change to receive signals in different frequency bands, which makes application range of the antenna 130c wider.

Figure 8A:
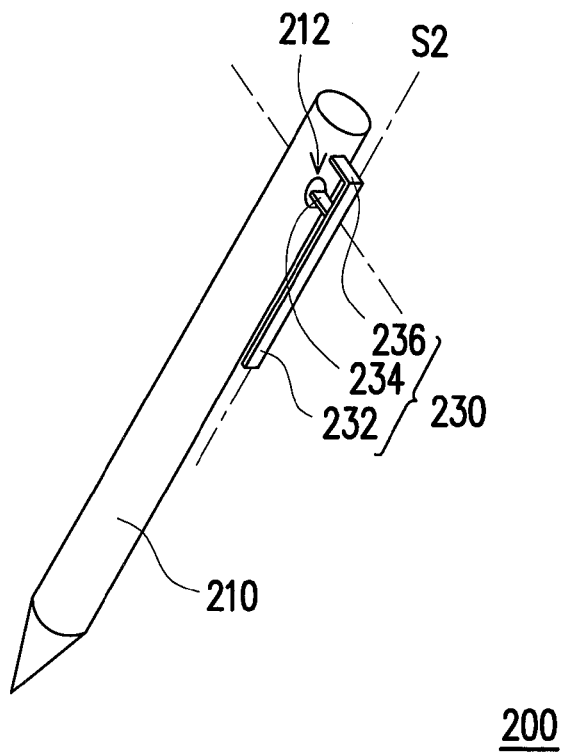
FIG. 8A is a schematic diagram showing a stylus in a fourth embodiment.
Figure 8B:
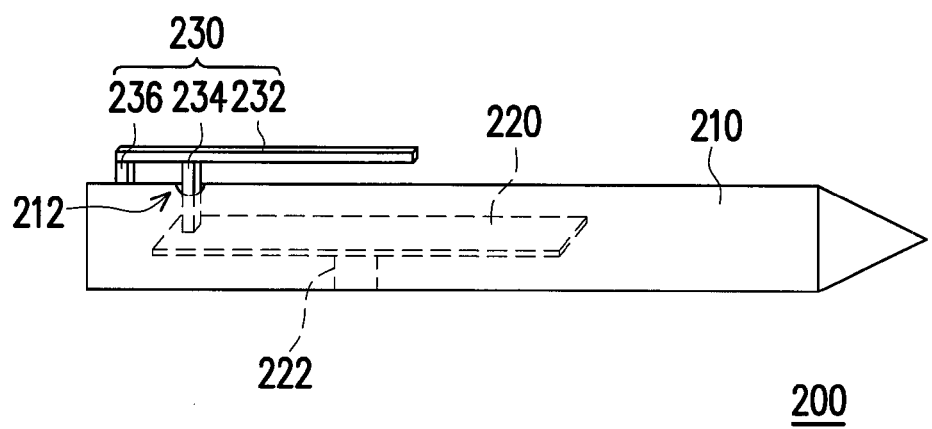
FIG. 8B is a sectional diagram showing the stylus in FIG. 8A.
Figure 8C:
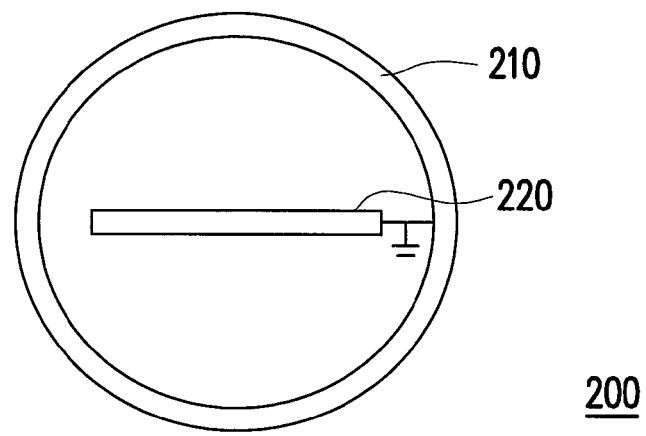
FIG. 8C is a sectional diagram showing the stylus in FIG. 8A from another angle of view.

FIG. 8A is a schematic diagram showing a stylus in a fourth embodiment, FIG. 8B is a sectional diagram showing the stylus in FIG. 8A, and FIG. 8C is a sectional diagram showing the stylus in FIG. 8A from another angle of view. Please refer to FIG. 8A to FIG. 8C, the stylus 200 includes a conductive rod 210, a circuit board 220 and an antenna 230. The conductive rod 210 may be made of metal and includes a first opening 212. The circuit board 220 is disposed in the conductive rod 210 and includes a ground portion 222. The conductive rod 210 is electrically connected to the ground portion 222.

In the embodiment, the antenna 230 may be a planar inverted F antenna (PIFA), and it includes a radiating portion 232, a feeding portion 234 and a ground section 236. The feeding portion 234 is connected to the circuit board 220 and extends from inside of the conductive rod 210 to outside via the first opening 212. The radiating portion 232 is at outside of the conductive rod 210 and is electrically connected to the feeding portion 234. The ground section 236 is electrically connected to the radiating portion 232 and is connected to the ground portion 222.

As shown in FIG. 8B, in the embodiment, the ground section 236 contacts with the conductive rod 210 to make the conductive rod 210 electrically connected to the ground portion 222 of the circuit board 220, and the ground section 236 is connected to the ground portion 222 via the conductive rod 210. The interference on the antenna 230 from the conductive rod 210 is reduced by electrically connecting the conductive rod 210 to the ground portion 222 of the circuit board 220, and thus the antenna 230 has good signal transmitting efficiency.

Furthermore, in the embodiment, the connection among the radiating portion 232 and the feeding portion 234, the ground section 236 is similar to that in FIG. 5A. As shown in FIG. 8A, the radiating portion 232 is slidably disposed at the feeding portion 234 and the ground section 236 around a sliding axis S2, and the sliding axis S2 is vertical to the central axis of the first opening 212. Thus, the radiating portion 232 can slide relative to the feeding portion 234 and the ground section 236 around the sliding axis S2.

Figure 9:
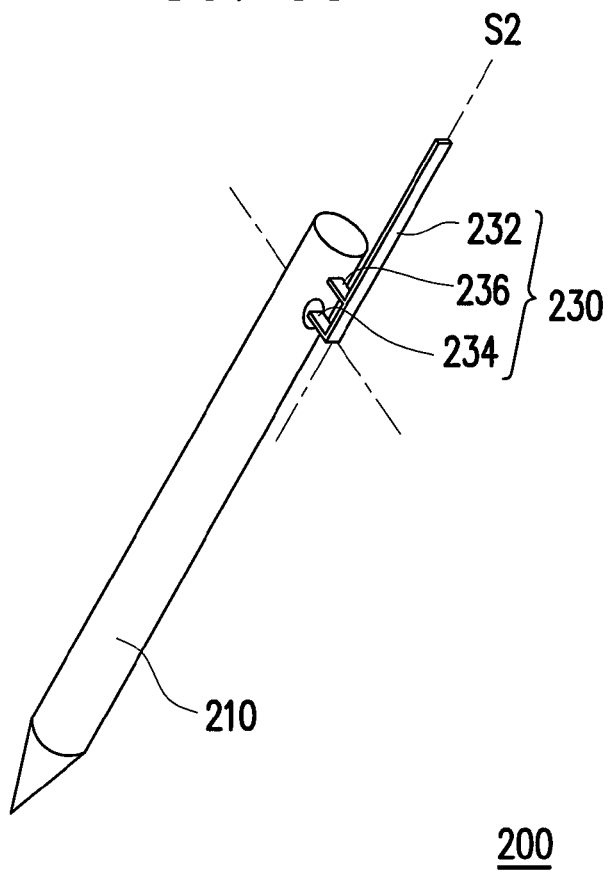
FIG. 9 is schematic diagram showing that the radiating portion in FIG. 8A slides to another position.

FIG. 9 is schematic diagram showing that the radiating portion in FIG. 8A slides to another position. The radiating portion 232 slides around the sliding axis S2 to make part of the radiating portion 232 away from the conductive rod 210. Thus, when the user uses the antenna 230 of the stylus 200 to receive and transmit signals, the interference on the antenna 230 from the conductive rod 210 is further reduced. Moreover, in the embodiment, when the radiating portion 232 is at the position shown in FIG. 8A or FIG. 9, the radiating portion 232 may be fixed via a fixing structure (such as a fixing bump formed at the radiating portion 232) to avoid unexpected sliding.

Figure 10A:
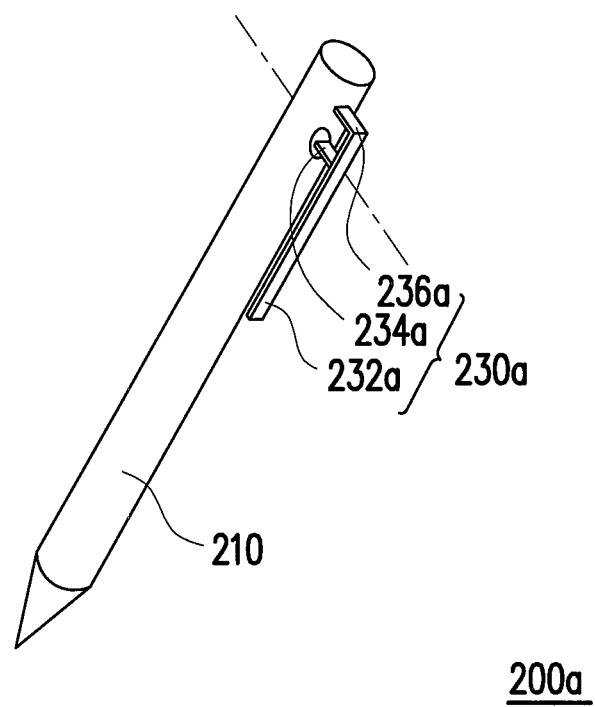
FIG. 10A is a schematic diagram showing a stylus in a fifth embodiment.
Figure 10B:
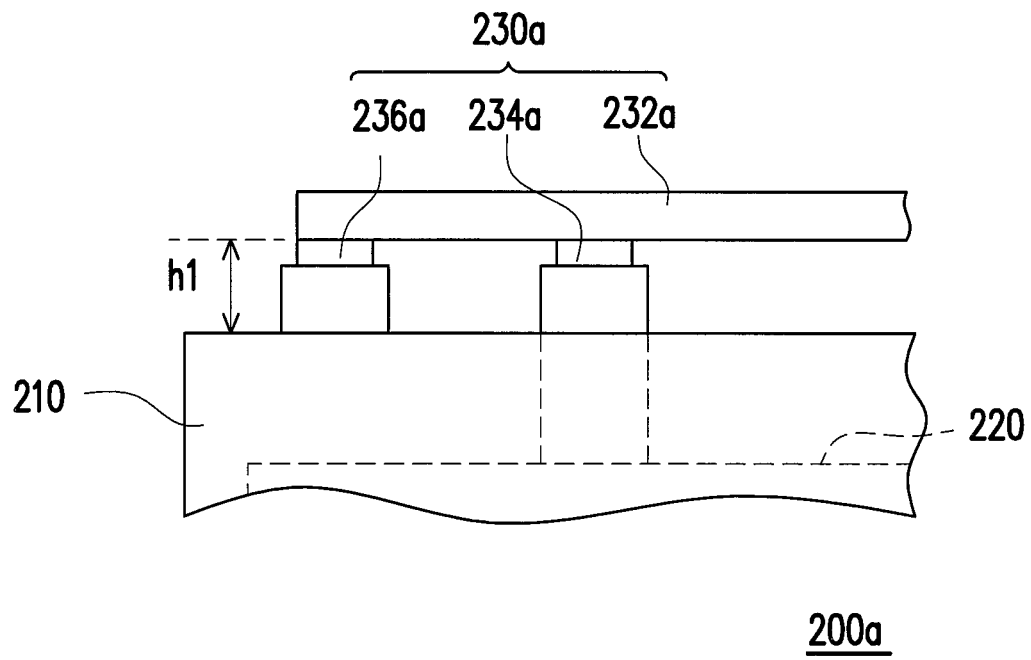
FIG. 10B is a side view showing the stylus in FIG. 10A.

FIG. 10A is a schematic diagram showing a stylus in a fifth embodiment, and FIG. 10B is a side view showing the stylus in FIG. 10A. Symbols for elements and a part of comments in FIG. 10A are similar to those in FIG. 8A, the same symbols denote the same or similar components, and the same descriptions for technology are omitted.

Please refer to FIG. 10A and FIG. 10B, in the embodiment, the antenna 230a of the stylus 200a may be a PIFA, and includes a radiating portion 232a, a feeding portion 234a and a ground section 236a. The difference between the embodiment in FIG. 10A and that in FIG. 8A is that both the feeding portion 234a and the ground section 236a are stretchable structures, and they can stretch out or draw back to change a distance between the radiating portion 232a and the conductive rod 210.

Figure 11A:
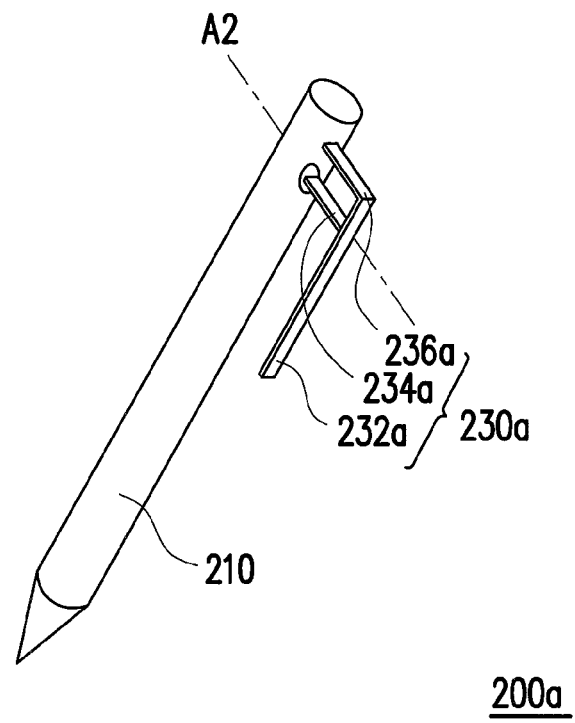
FIG. 11A is a schematic diagram showing that the feeding portion and the ground section in FIG. 10A stretches.
Figure 11B:
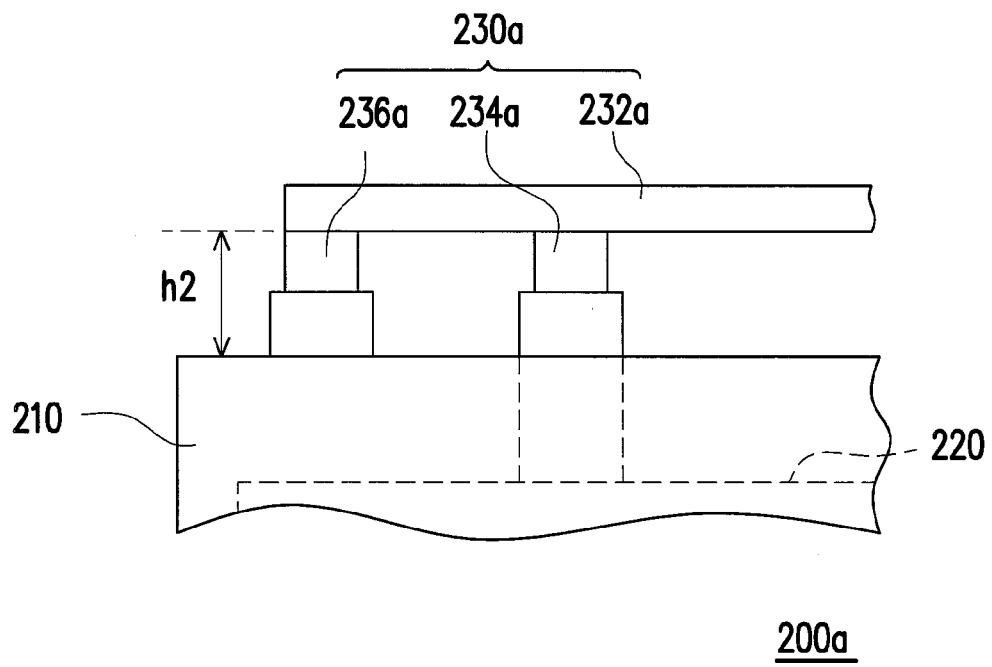
FIG. 11B is a side view showing the stylus in FIG. 11A.

FIG. 11A is a schematic diagram showing that the feeding portion and the ground section in FIG. 10A stretches, and FIG. 11B is a side view showing the stylus in FIG. 11A. Please refer to FIG. 11A and FIG. 11B, after the feeding portion 234a and the ground section 236a stretch out, a distance h1 (as shown in FIG. 10B) between the radiating portion 232a and the conductive rod 210 increases to a distance h2 shown in FIG. 11B. Thus, the distance between the radiating portion 232a and the conductive rod 210 is increased, and the interference on the antenna 230a from the conductive rod 210 is further reduced. In the embodiment, the distance h2 may be longer than 4 mm, which is not limited herein.

Figure 12A:
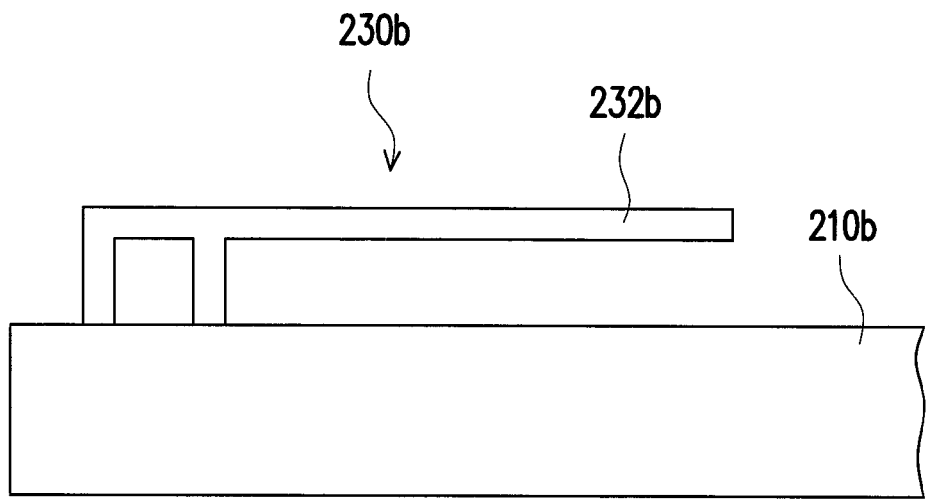
FIG. 12A is a side view showing a stylus in a sixth embodiment.

FIG. 12A is a side view showing a stylus in a sixth embodiment. In the stylus 200b of FIG. 12A, an equivalent capacitor is formed between the radiating portion 232b and the conductive rod 210b to adjust an impedance matching of the antenna 230b and improve the signal receiving and transmitting efficiency. In the embodiment, the equivalent capacitor is formed via air medium between the radiating portion 232b and the conductive rod 210b, which is not limited herein.

Figure 12B:
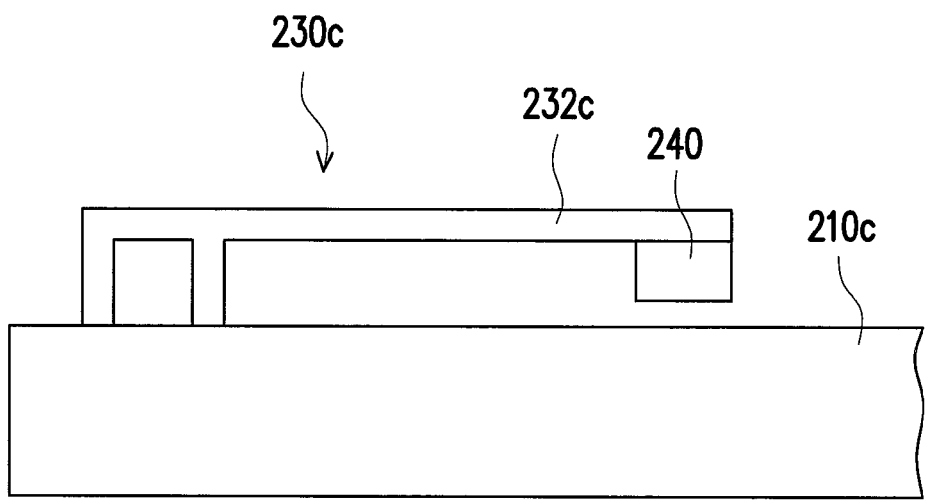
FIG. 12B is a side view showing a stylus in a seventh embodiment.

FIG. 12B is a side view showing a stylus in a seventh embodiment. Please refer to FIG. 12B, in the embodiment, a protruding block 240 is formed at an end of the radiating portion 232c. The protruding block 240 is disposed between the radiating portion 232c and the conductive rod 210c, and the protruding block 240 may be made of non-conductive material. The equivalent capacitor is formed via the protruding block 240 and air between the radiating portion 232c and the conductive rod 210c. The thickness or the width of the protruding block 240 can be adjusted to change the equivalent capacitor, adjust the impedance matching of the antenna 230c and improve the signal receiving and sending efficiency of the antenna 230c. Furthermore, the antenna 230c can be used as a clamp of the stylus 200c, and the protruding block 240 is a locking portion at the end of the clamp. When the user fixes the stylus 200c at a position via the antenna 230c, the locking portion can reinforce the fixing.

Figure 13A:
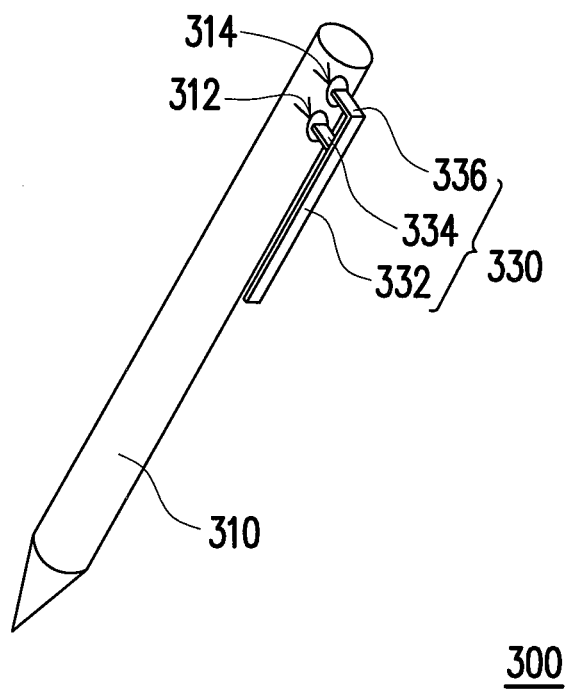
FIG. 13A is a schematic diagram showing a stylus in an eighth embodiment.
Figure 13B:
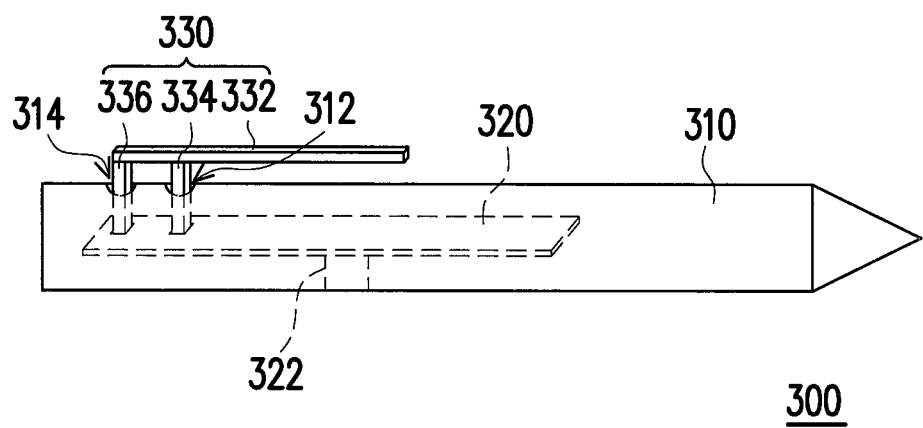
FIG. 13B is a side view showing the stylus in FIG. 13A.

FIG. 13A is a schematic diagram showing a stylus in an eighth embodiment, and FIG. 13B is a side view showing the stylus in FIG. 13A. The embodiment in FIG. 13A is similar to that in FIG. 8A, the difference is the connecting way between the antenna and the ground. Please refer to FIG. 13A and FIG. 13B, in the embodiment, the antenna 330 is a PIFA, and it includes a radiating portion 332, a feeding portion 334 and a ground section 336. The conductive rod 310 includes a first opening 312 and a second opening 314. The feeding portion 334 extends from inside of the conductive rod 310 to outside via the first opening 312, and the ground section 336 extends from outside of the conductive rod 310 to inside via the second opening 314 to connect to the ground portion 322 of the circuit board 320, which reduces the interference on the antenna 330 from the conductive rod 310 and keeps a good signal receiving and sending efficiency of the antenna 330.

The feeding portion 334 and the ground section 336 of the stylus 300 in FIG. 13A may be stretchable structures, and they can stretch out or draw back to change a distance between the radiating portion 332 and the conductive rod 310. Relating descriptions can be referred to the embodiments in FIG. 10A and FIG. 10B, which is omitted herein.

In sum, the conductive rod of the stylus is connected to the ground portion of the circuit board, so as to reduce the interference on the antenna of the stylus from the conductive rod. Consequently, even though the rod of the stylus is made of metal or other conductive materials according to requirements of appearance or design, the antenna of the stylus still has good signal transmitting efficiency. Moreover, the radiating portion of the antenna may move (such as rotate or slide) relative to the conductive rod, so as to make part of the radiating portion away from the conductive rod and further reduce the interference on the antenna of the stylus from the conductive rod.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A stylus, comprising:
   a conductive rod made of conductive materials and including a first opening in the conductive materials;
   a circuit board disposed in the conductive rod and including a ground portion, wherein the conductive rod is electrically connected to the ground portion;
   an antenna including a radiating portion and a feeding portion, wherein the feeding portion is electrically connected to the circuit board and extends from inside of the conductive rod to outside via the first opening, and the radiating portion is disposed at the outside of the conductive rod and electrically connected to the feeding portion; and
   an insulator disposed in the first opening to electrically insulate between the feeding portion and the conductive materials of the conductive rod.

2. The stylus according to claim 1, wherein the radiating portion is pivotally connected to the feeding portion around a rotating axis, and the radiating portion rotates around the rotating axis to make part of the radiating portion away from the conductive rod.

3. The stylus according to claim 2, wherein the rotating axis is a central axis of the first opening.

4. The stylus according to claim 2, wherein the rotating axis is vertical to a central axis of the first opening.

5. The stylus according to claim 1, wherein the radiating portion is slidably disposed at the feeding portion around a sliding axis, and the radiating portion slides around the sliding axis to make part of the radiating portion away from the conductive rod.

6. The stylus according to claim 5, wherein the sliding axis is vertical to a central axis of the first opening.

7. The stylus according to claim 1, wherein the antenna further includes a ground section which is electrically connected to the radiating portion and the ground portion.

8. The stylus according to claim 7, wherein the ground section is connected to the ground portion via the conductive rod.

9. The stylus according to claim 7, wherein the conductive rod further includes a second opening, the ground section extends from inside of the conductive rod to outside via the second opening and is electrically connected to the ground portion.

10. The stylus according to claim 7, wherein the radiating portion is slidably disposed at the feeding portion and the ground section around a sliding axis, and the radiating portion slides around the sliding axis to make part of the radiating portion away from the conductive rod.

11. The stylus according to claim 10, wherein the sliding axis is vertical to a central axis of the first opening.

12. The stylus according to claim 7, wherein the feeding portion and the ground section are stretchable structures which are adapted to change a distance between the radiating portion and the conductive rod by stretching.

13. The stylus according to claim 1, wherein the radiating portion is a stretchable structure which is adapted to stretch out or draw back to change the length of the radiating portion.

14. The stylus according to claim 1, wherein an equivalent capacitor is formed between the radiating portion and the conductive rod.

* * * * *